US007111873B1

(12) United States Patent
Coogle

(10) Patent No.: US 7,111,873 B1
(45) Date of Patent: Sep. 26, 2006

(54) SLIDE COUPLING FITTING FOR CONNECTING CONDUITS

(76) Inventor: Gregory Coogle, 492 NW. 162nd Ave., Pembroke Pines, FL (US) 33028

( * ) Notice: Subject to any disclaimer, the term of this patent is extended or adjusted under 35 U.S.C. 154(b) by 144 days.

(21) Appl. No.: 10/788,648

(22) Filed: Feb. 28, 2004

Related U.S. Application Data

(63) Continuation-in-part of application No. 10/144,113, filed on May 10, 2002, now Pat. No. 6,708,717.

(51) Int. Cl.
*F16L 27/12* (2006.01)

(52) U.S. Cl. ......................... 285/32; 285/298; 285/302

(58) Field of Classification Search .................. 285/31, 285/32, 298, 302, 303, 356, 357
See application file for complete search history.

(56) References Cited

U.S. PATENT DOCUMENTS

| | | | | | |
|---|---|---|---|---|---|
| 141,893 | A | * | 8/1873 | Scofield | 285/32 |
| 1,492,519 | A | * | 4/1924 | Meyer | 285/32 |
| 2,297,966 | A | * | 10/1942 | Luff | 285/32 |
| 2,344,698 | A | * | 3/1944 | Howe | 285/32 |
| 3,984,130 | A | * | 10/1976 | Berger et al. | 285/31 |
| 4,386,796 | A | | 6/1983 | Lyall et al. | |
| 4,403,654 | A | * | 9/1983 | Haynes | 166/73 |
| 4,435,005 | A | | 3/1984 | Berger et al. | |
| 4,547,004 | A | | 10/1985 | Goldberg | |
| 4,549,756 | A | | 10/1985 | Basile | |
| 5,011,193 | A | * | 4/1991 | Porte | 285/31 |
| 5,160,174 | A | * | 11/1992 | Thompson | 285/32 |
| 5,971,035 | A | * | 10/1999 | Griffioen | 138/155 |
| 6,619,697 | B1 | * | 9/2003 | Griffioen et al. | 285/126.1 |
| 2002/0125715 | A1 | * | 9/2002 | Rochelle | 285/31 |
| 2002/0125716 | A1 | * | 9/2002 | Rochelle | 285/32 |

* cited by examiner

*Primary Examiner*—James M. Hewitt
(74) *Attorney, Agent, or Firm*—Yi Li

(57) ABSTRACT

A slide coupling fitting for connecting a tubular conduit and the method of use are provided. The fitting includes a tubular body, two opposing open ends, and an external threaded section on an exterior of the tubular body adjacent to each open end; and two tubular sliding couplers, each having an internal diameter slightly larger than an external diameter of the tubular body, and each being connected to one of the open ends of the tubular body, respectively, and coaxial with the tubular body. Each tubular sliding coupler has an internal threaded section adjacent to an inner end which is closer to a longitudinal center of the tubular body, and a smooth interior at an opposing outer end for slidably engaging a tubular conduit. The internal threaded section is complementary to the external threaded section of the tubular body for mutual engagement.

14 Claims, 10 Drawing Sheets

SLIDE COUPLING FITTING FOR CONNECTING CONDUITS

REFERENCE TO RELATED APPLICATION

This application is a continuation-in-part of patent application Ser. No. 10/144,113, filed May 10, 2002, now U.S. Pat. No. 6,708,717, which is herein incorporated by reference in its entirety.

FIELD OF THE INVENTION

The present invention relates in general to connectors for tubular conduits, and in particular to fittings which has both a threaded connection section and a sliding connection section for slidably coupling to the ends of conduit.

BACKGROUND OF THE INVENTION

Prior art connectors and fittings have been utilized for joining to tubular conduits for connecting the tubular conduits together or to other members. The tubular conduits have included piping, ducting, electrical conduits and the like, which have been used for both fluid flow conduits and to provide protective enclosures for electrical power and telecommunication cables. For fluid flow conduits, they are frequently buried underground, and have limited access and mobility during repairing. In the prior art, fittings have been typically joined to the terminal ends of tubular conduits by either adhesive bonding, swedging or securing two mating threads together. A swedged fitting requires two swedging members between which a terminal end section of a tubular conduit is squeezed. One of the swedging members is placed on the interior of the tubular conduit which results in a restriction which is smaller than the interior diameter of the tubular conduit, rather than providing a full bore opening. A threaded connection requires the threading of either an interior surface or an exterior surface of the tubular conduit, which is time consuming and labor intensive. For the buried conduits, threading the conduits becomes very difficult, sometimes, is not feasible at all.

Because of the poor accessibility and mobility of already installed conduits, a flexible fitting structure and operating mechanism are highly desirable for conduit repairing. Slidable fitting mechanism has been used in some commercial products, which has one tubular coupling member that can be slidably extended from the fitting to joint the conduit. However, these structures completely depend on adhesive bonding, therefore, have poor resistance to environmental temperature variations.

Therefore, there exists a need for an improved fitting structure, and a convenient method for connecting the conduits.

SUMMARY OF THE INVENTION

In one aspect, the present invention provides slide coupling fittings for connecting a tubular conduit.

In one embodiment, the slide coupling fitting comprises a tubular body having a central passage defining a central axis, two opposing open ends, and an external threaded section on an exterior of the tubular body adjacent to each open end; and two tubular sliding couplers, each having an internal diameter slightly larger than an external diameter of the tubular body, and each being connected to one of the open ends of the tubular body, respectively. Each the tubular sliding coupler having an internal threaded section adjacent to an inner end which is closer to a longitudinal center of the tubular body, and a smooth interior at an opposing outer end for slidably engaging a tubular conduit; the internal threaded section being complementary to the external threaded section of the tubular body for mutual engagement.

The tubular body further comprises at the each open end a seal groove extending about the central axis and a seal member which is disposed within the seal groove and extends therefrom to sealingly engage an interior periphery of the tubular sliding coupler. Furthermore, the tubular body also comprises at the each open end an external block section disposed between the seal groove and the external threaded section. The tubular body can further comprise a stopper extending about the central axis on the exterior of the tubular body disposed at approximately a longitudinal center of the tubular body for maintaining the sliding coupler in appropriate position.

Furthermore, each of the tubular sliding couplers further comprises an internal block section extending about a central axis of the tubular sliding couplers. The external block section of the tubular body and the internal block section of the sliding coupler assist positioning of the sliding coupler along the tubular body when engaging the internal threaded section with the external threaded section.

In a further embodiment, the present invention provides a slide coupling fitting which comprises a tubular body having a central passage, a first open end, an external threaded section on an exterior of the tubular body near the first open end, and an opposing second open end; and a tubular sliding coupler having an internal diameter larger than an external diameter of the tubular body, and being connected to the first open end of the tubular body; the tubular sliding coupler having an internal threaded section adjacent to an inner end which is closer to a longitudinal center of the tubular body, and a smooth interior at an opposing outer end for slidably engaging a first tubular conduit; the internal threaded section being complementary to the external threaded section of the tubular body for mutual engagement.

The second end of the tubular body further comprises a tubular connector which is coaxially and fluid-tight connected to the second open end of the tubular body at one end, and with an opposing coupling end for receiving a second tubular conduit. In one embodiment, the coupling end has a smooth interior periphery. Alternatively, the coupling end has an internal threaded section for threaded connection with a tubular conduit.

Furthermore, in either embodiment described above, the slide coupling fittings can further comprise a middle coupler connected to a middle opening of the tubular body. The middle coupler comprises a tubular connector extending perpendicular to the central axis of the tubular body; one end of the tubular connector being fluid-tight connected to the tubular body and an opposing open coupling end for receiving a tubular conduit; and a central axis of the tubular connector being aligned with the center of the middle opening.

In another aspect, the present invention provides a method of connecting a fitting to a tubular conduit. The method includes the steps of providing a fitting comprising a tubular body having a central passage, a first open end, a first external threaded section on an exterior of the tubular body near the first open end; and a first tubular sliding coupler connected to the first open end of the tubular body; the first sliding coupler having a first internal threaded section adjacent to a first inner end which is closer to a longitudinal center of the tubular body, and a smooth interior at an opposing first outer end; wherein the internal diameter of the first outer end is complementary to the external diameter of a first tubular conduit to be connected; applying an adhesive on the smooth interior of the first outer end of the first sliding coupler; engaging the fitting with the first tubular conduit by having the first open end toward an end of the first fluid conduit, then sliding the first sliding coupler outwardly along the tubular body to snuggly encase an end section of the first tubular conduit; and turning the first sliding coupler around the tubular body to engage the first internal threaded section with the first external threaded section, with an advancing direction toward the first tubular conduit; and thereby the sliding coupler forms a fluid-tight connection with the first tubular conduit at the first outer end and forms a fluid-tight connection with the tubular body at the first inner end.

The invention will be better understood from the ensuing description of preferred embodiments.

BRIEF DESCRIPTION OF THE DRAWINGS

It is noted that the like parts are labeled by the like numbers throughout the drawings.

DETAILED DESCRIPTION OF THE PREFERRED EMBODIMENTS

In one embodiment, the present invention provides a slide coupling fitting which has two tubular sliding couplers for slidably connecting the fitting between two tubular conduits.

Figure 1:
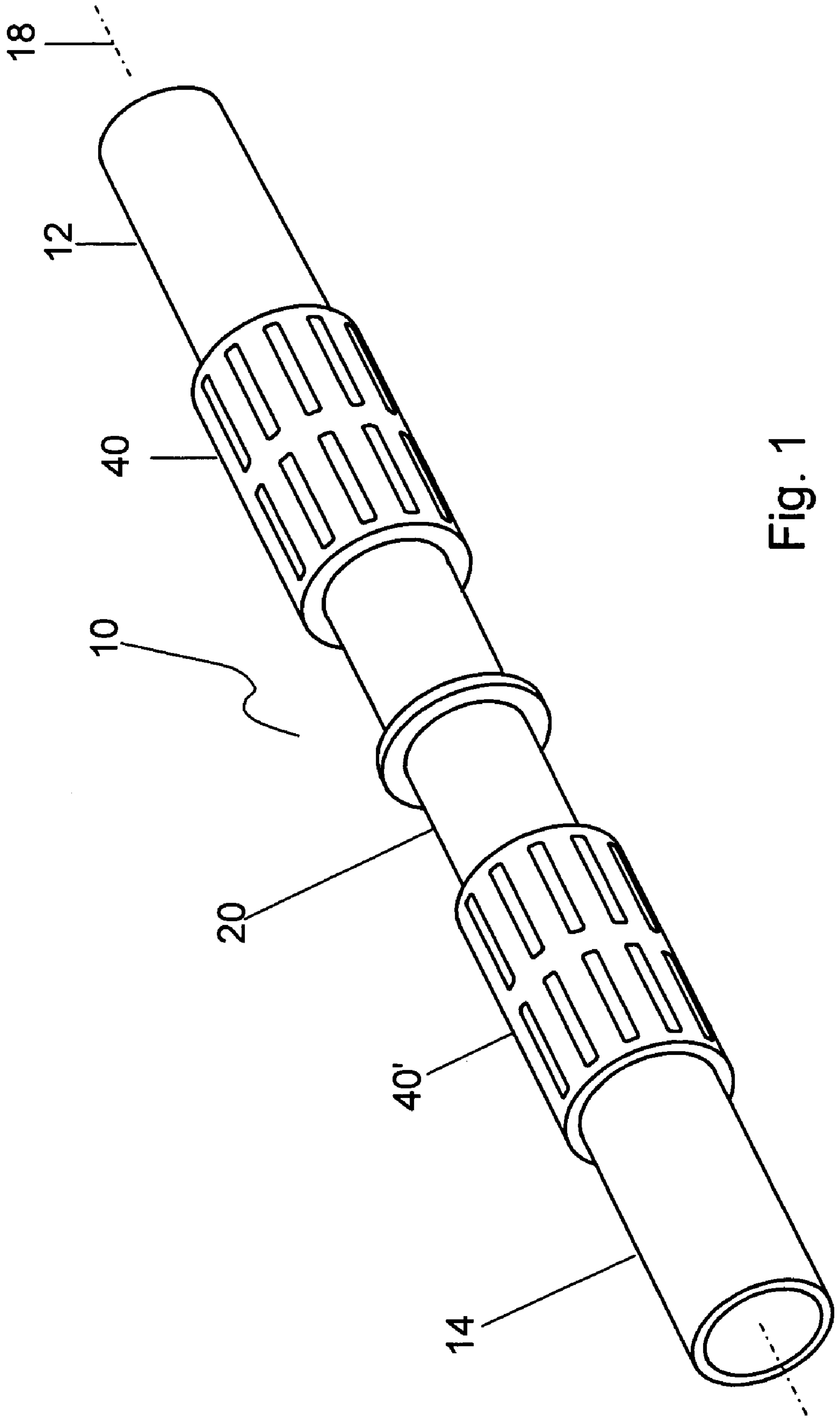
FIG. 1 is a perspective view of a slide coupling fitting of one embodiment of the present invention, which is connected to two tubular conduits.

Referring now to FIG. 1, there is illustrated a perspective view of a slide coupling fitting 10 for joining to a tubular conduit 12 and a tubular conduit 14. The tubular conduits 12 and 14 are commonly used pipes, which are usually made of PVC or other plastic pipe materials, and have smooth exterior peripheries. Commonly used tubular conduits 12 and 14 range in size from one-half inch to six inches in diameter. The fitting 10, tubular conduit 12 and tubular conduit 14 are coaxially aligned along a central axis 18.

Figure 2:
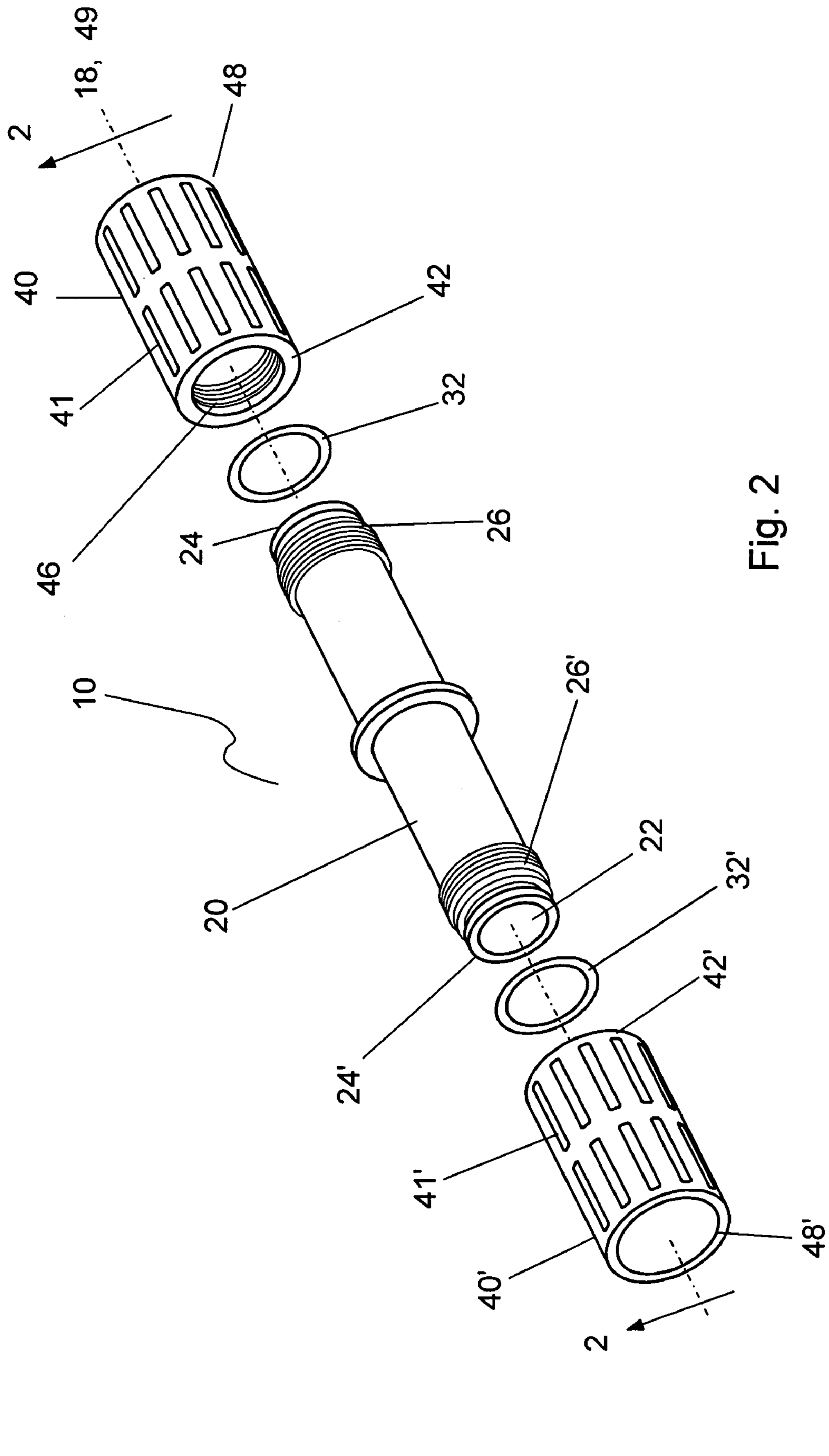
FIG. 2 is an exploded perspective view of a slide coupling fitting of one embodiment of the present invention.
Figure 3:
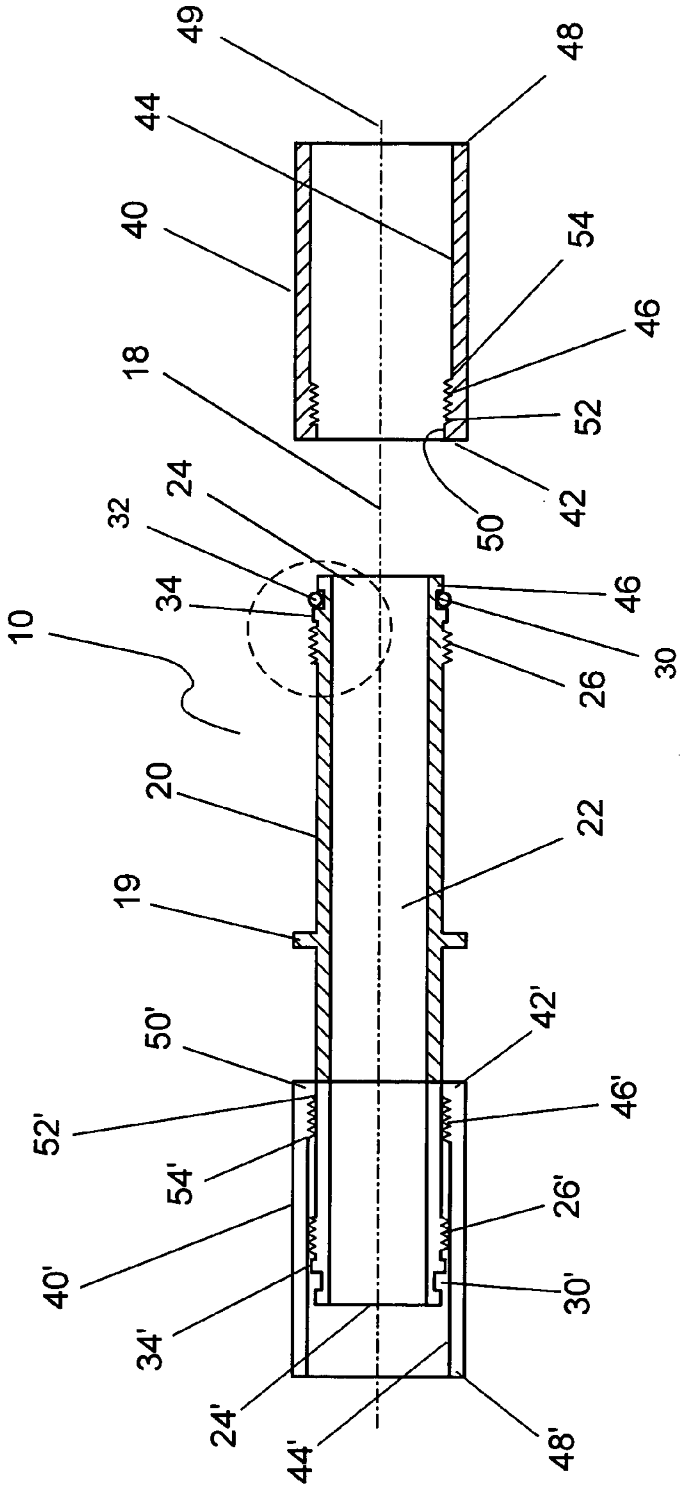
FIG. 3 is a partially exploded, longitudinal section view of the slide coupling fitting, taken along section line 2—2 of FIG. 2.
Figure 3A:
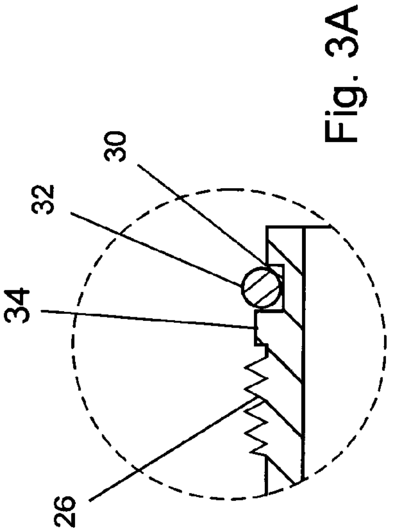
FIG. 3A is an amplified section view of the end portion of the tubular body of the slide coupling fitting of FIG. 2.

Referring now to FIGS. 2 thru 3A, slide coupling fitting 10 comprises a tubular body 20 having a central passage 22 defining central axis 18, two opposing open ends 24 and 24', and two external threaded sections 26 and 26' on an exterior of tubular body 20; wherein external threaded section 26 is adjacent to open end 24, and external threaded section 26' is adjacent to open end 24'; and two tubular sliding couplers 40 and 40'. Each of the tubular sliding couplers 40 and 40' has an internal diameter slightly larger than an external diameter of tubular body 20, and is connected to one of the open ends 24 or 24' of tubular body 20, respectively, and is coaxial with tubular body 20. Each of tubular sliding couplers 40 and 40' has an internal threaded section 46 or 46' adjacent to an inner end 42 or 42' which is closer to a longitudinal center of the tubular body 20, and a smooth interior 44 or 44' at an opposing outer end 48 or 48' for slidably engaging a tubular conduit. Internal threaded sections 46 and 46' are complementary to external threaded sections 26 and 26', respectively, of tubular body 20 for mutual engagement.

Tubular body 20 further comprises two seal grooves 30 and 30' extending about central axis 18 and a pair of seal members 32 and 32' which are disposed within seal grooves 30 and 30', respectively. Seal members 32 and 32' extend from the respective one of the seal grooves to sealingly engage an interior periphery of tubular sliding couplers 40 and 40', respectively. Each seal groove 30 or 30' is disposed between the respective one of external threaded sections 26 or 26' and the respective one of open ends 24 or 24'. In a preferred embodiment, the seal members are made of elastic materials, such as an O-ring made of rubber, seventy durometer nitrile, or other suitable materials.

As shown, tubular body 20 further comprises two external block sections 34 and 34' extending about central axis 18 on the exterior of tubular body 20. Each external block section is disposed between the respective one of seal grooves 30 or 30' and the respective one of external threaded sections 26 or 26'. On the other hand, each tubular sliding coupler 40 or 40' further comprises a internal block section 50 or 50' extending about a central axis 49 of tubular sliding coupler 40 or 40' and disposed at inner end 42 or 42' and in contact with a front end 52 or 52' of internal threaded section 46 or 46'. Internal block section 50 or 50' has a diameter approximately equivalent to an outside diameter of internal threaded section 46 or 46'. Since external block section 34 or 34' is not complementary to internal threaded section 46 or 46', and internal block section 50 or 50' is not complementary to external threaded section 26 or 26', they prevent sliding coupler 40 or 40' from over advancing beyond external threaded section 26 or 26'.

Moreover, tubular body 20 can further comprise a stopper 19 extending about central axis 18 on the exterior of tubular body 20 disposed at approximately a longitudinal center of tubular body 20. The stopper 19 functions as a positioning guide to retain sliding coupler 40 or 40' in its respective side along tubular body 20.

Furthermore, tubular sliding couplers 40 and 40' can have a roughened exterior peripheral surface 41 and 41', which is either knurled or has slots formed into the surface of the tubular sliding couplers 40 and 40'. In the preferred embodiment, the slots of peripheral surface 41 and 41' are spaced apart in a circumferential arrangement which coaxially extends around central axis 49 with the slots extending parallel to central axis 49. The roughened exterior peripheral surface 41 and 41' provides a surface that is easy for a hand or a tool to grip on. Alternatively, exterior peripheral surface 41 and 41' can be provided by protuberant ribs which extend outward from the exterior surface of sliding couplers 40 and 40' in a longitudinal direction which is parallel to central axis 49, such that the protuberant ribs are circumferentially spaced apart around the longitudinal axis 49, as shown for the slots of exterior peripheral surface 41 and 41'.

Figure 2A:
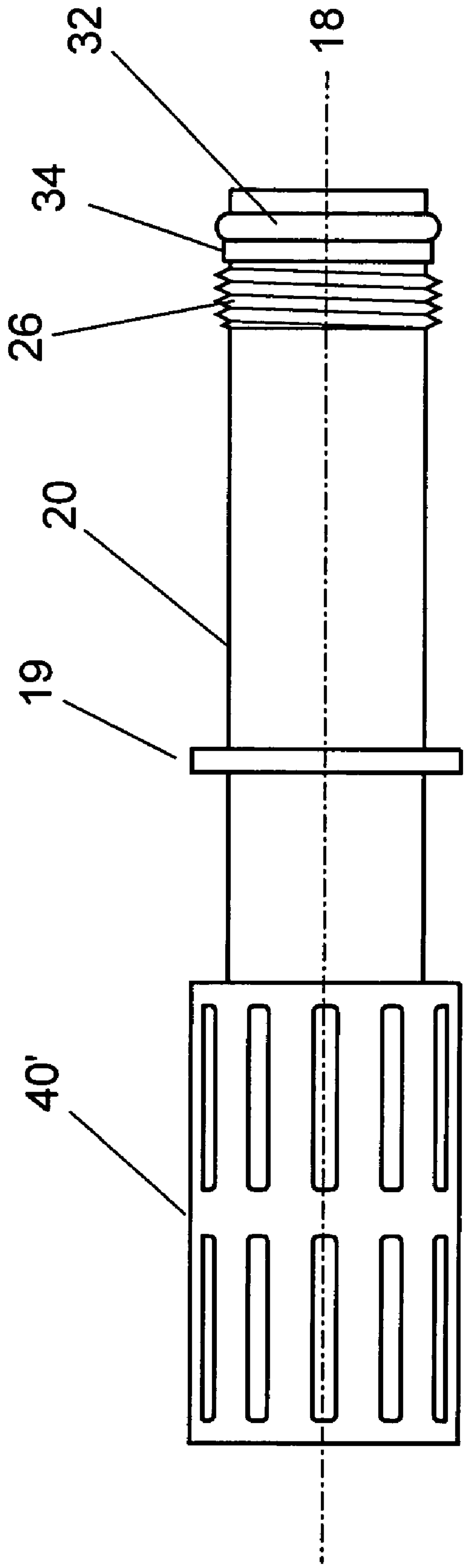
FIG. 2A is a side view of a partially assembled slide coupling fitting of FIG. 2.

FIGS. 2A and 3 show a partially assembled slide coupling fitting 10 with one sliding coupler 40 or 40' connected to tubular body 20. As shown in FIG. 3, prior to use, external threaded section 26 or 26' is not engaged with the corresponding internal threaded section 46 or 46', and sliding coupler 40 or 40' can slide along tubular body 20.

Figure 4:
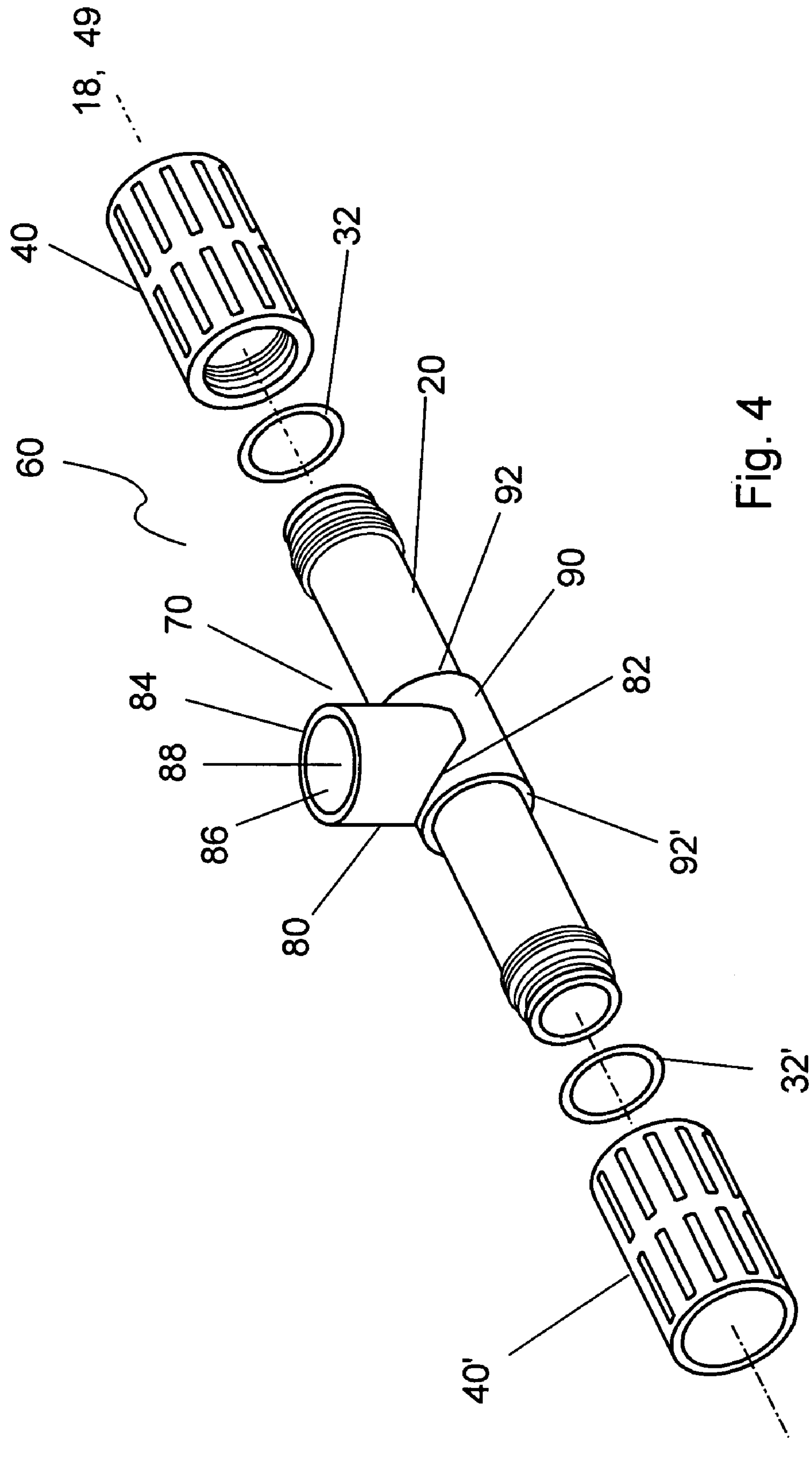
FIG. 4 is an exploded perspective view of a slide coupling fitting of a further embodiment of the present invention.
Figure 5:
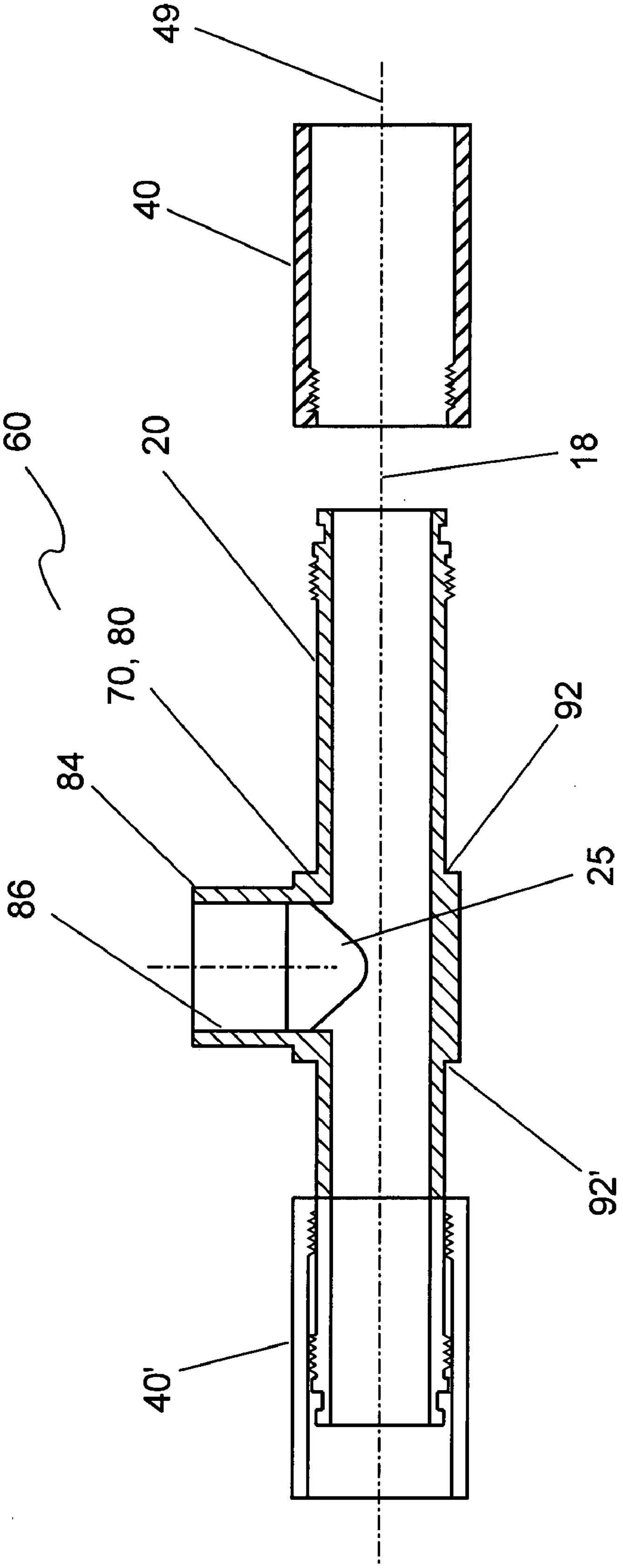
FIG. 5 is a partially exploded, longitudinal section view of the slide coupling fitting of FIG. 4.
Figure 6:
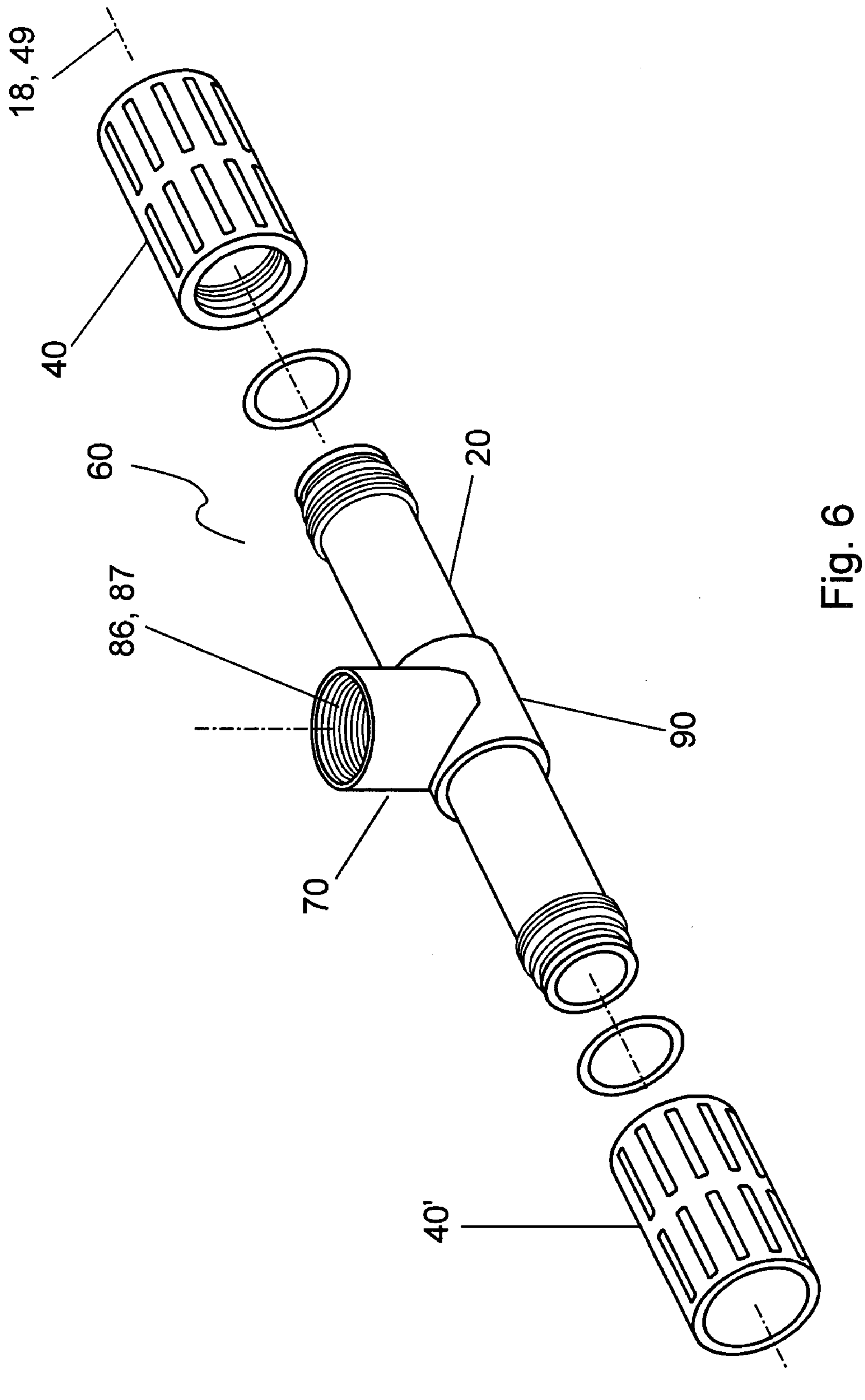
FIG. 6 is an exploded perspective view of a slide coupling fitting of FIG. 4 with an internal threaded section in the interior of the middle coupler.

In a further embodiment, the present invention provides a slide coupling fitting 60, as shown in FIGS. 4 thru 6. In this embodiment, slide coupling fitting 60 has the same structure of the sliding coupling fitting 10, except that fitting 60 further comprises a middle coupler 70 connected perpendicularly to the tubular body 20 and a middle opening 25 along tubular body 20. Middle coupler 70 comprises a tubular connector 80 having one end 82 fluid-tight connected to tubular body 20 and an opposing open coupling end 84 for receiving a tubular conduit. Tubular connector 80 is perpendicular to central axis 18 of tubular body 20, with central axis 88 of tubular connector 80 aligned with the center of the middle opening 25. Preferably, middle coupler 70 further comprises an enforcement member 90 which enforce the connection between tubular connector 80 and tubular body 20. In one exemplary embodiment as shown in FIG. 4, the enforcement member 90 is a tubular layer which extends about central axis 18 on the exterior of tubular body 20 and merges with the connection line between tubular connector 80 and tubular body 20. The length of the tubular layer is slightly longer than the external diameter of tubular connector 80. When produced by injection molding, enforcement member 90 is an integral part of tubular body 20.

In the embodiment shown in FIGS. 4 and 5, interior 86 of tubular connector 80 is smooth. In use, a tubular conduit can be inserted into coupling end 84, and further secured with an adhesive between the exterior surface of the conduit and interior 86 to form a fluid-tight connection. Alternatively, as shown in FIG. 6, the interior 86 of tubular connector 80 adjacent to coupling end 84 has a threaded section 87. With this structure, a tubular conduit with a complementary external thread can be connected to the middle coupler by screwing slide coupling fitting 60 onto the tubular conduit.

With slide coupling fitting 60, stopper 19 is not needed. The two edges 92 and 92' of the enforcement member 90 function as stoppers to sliding coupler 40 and 40', respectively.

Figure 7:
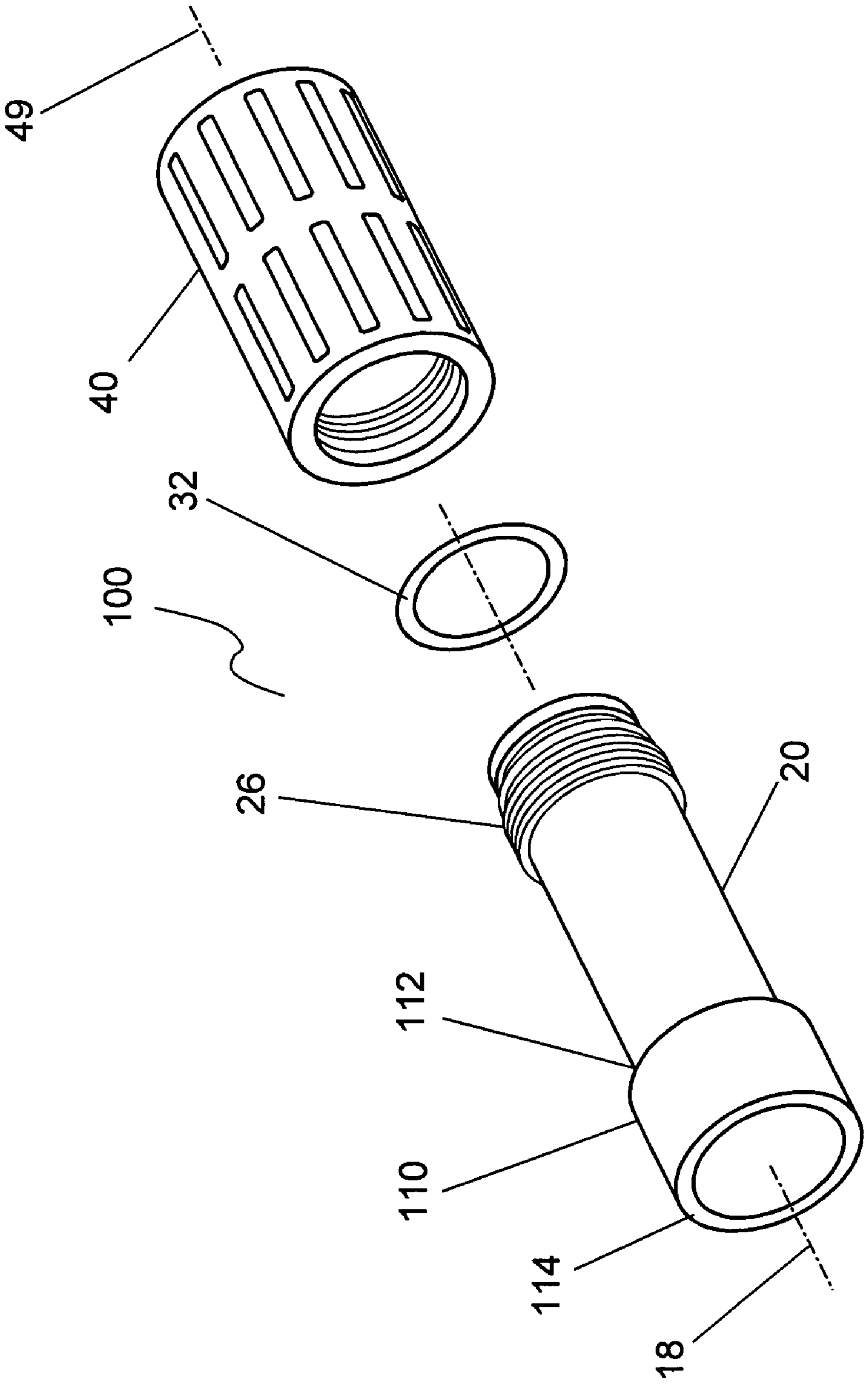
FIG. 7 is an exploded perspective view of a slide coupling fitting of another embodiment of the present invention, which has one fixed coupler and one sliding coupler.
Figure 8:
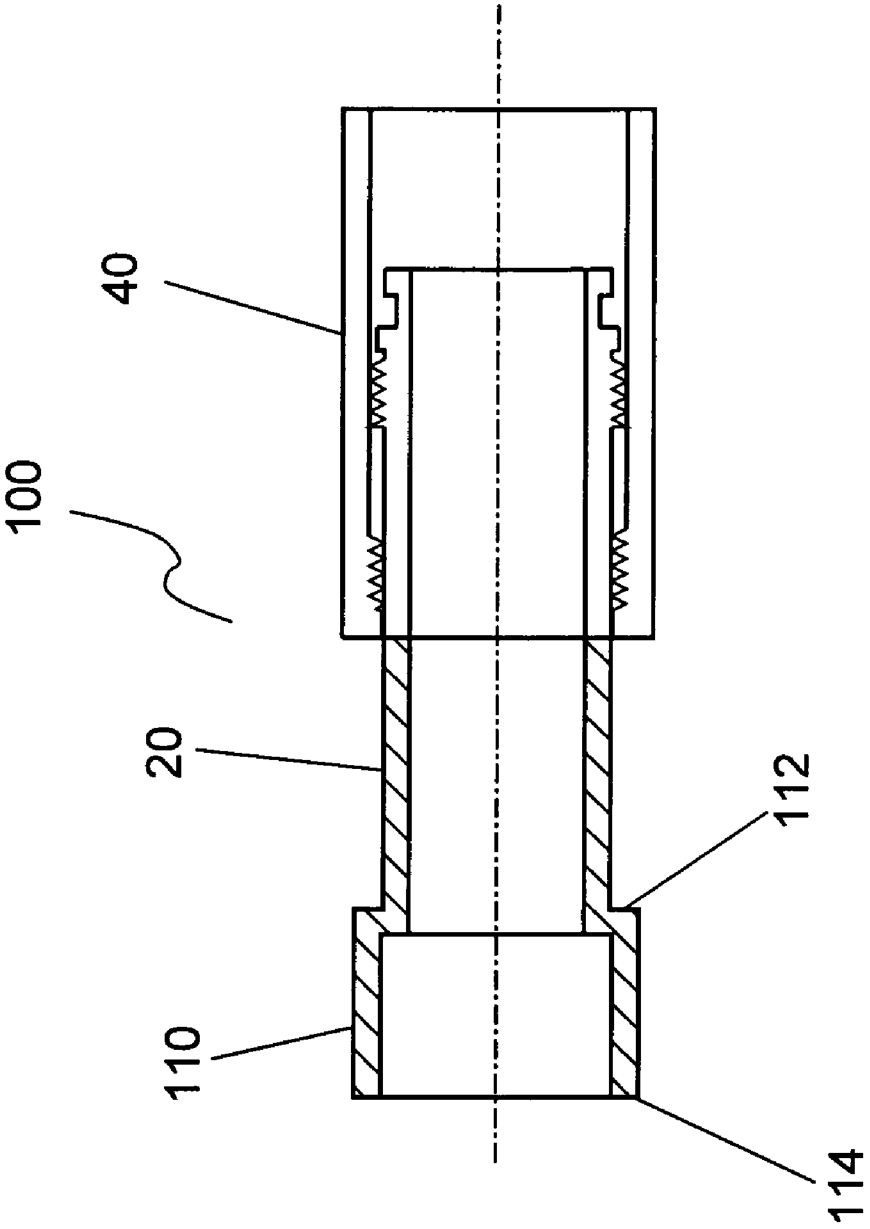
FIG. 8 is a longitudinal section view of the slide coupling fitting of FIG. 7.

Referring now to FIGS. 7 and 8, in a yet further embodiment the present invention provides another slide coupling fitting 100. As shown, slide coupling fitting 100 has on one side the same structure as slide coupling fitting 10, but has a different structure on the other side. More specifically, slide coupling fitting 100 has tubular body 20, and on one side, it has the same external threaded section 26, seal groove 30, external block section 34, and sliding coupler 40. On the opposing side, open end 24' is coaxially connected to a fixed tubular coupler 110. Tubular coupler 110 is a tubular member with two opposing open ends 112 and 114 and has an internal diameter approximately same to the external diameter of tubular body 20. Open end 112 is connected to open end 24' of tubular body 20, and open end 114 is disposed outwardly for receiving a tubular conduit. When produced by injection molding, tubular coupler 110 can be an integral part of tubular body 20, with an enlarged internal diameter for receiving a conduit.

As can be appreciated, in this embodiment tubular body 20 can have a relatively shorter length than those of fittings 10 and 60. Therefore, fitting 100 can be utilized in the situation where the space is limited between two conduits, and shorter fitting is required. With a relatively short tubular body 20, the edge formed by open end 112 can function as the stopper for sliding coupler 40. However, if tubular body 20 has a longer length, a stopper 19 can still be used as described previously.

Figure 9:
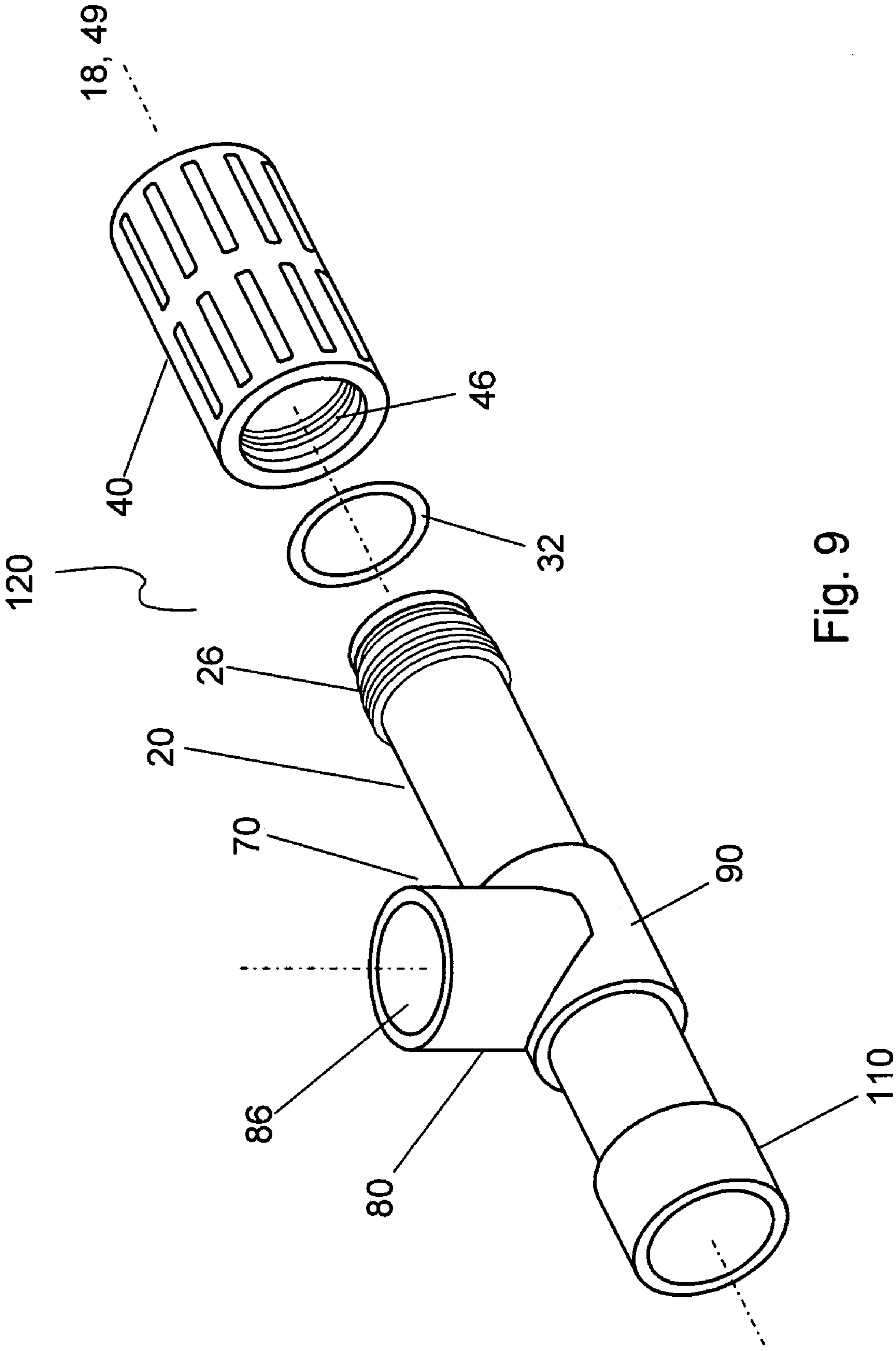
FIG. 9 is an exploded perspective view of a slide coupling fitting of a yet further embodiment of the present invention.

In a yet further embodiment, the present invention provides a slide coupling fitting 120, as illustrated in FIG. 9. Slide coupling fitting 120 has the same structure as slide coupling fitting 110, except that slide coupling fitting 120 further comprise a middle coupler 70. The structure of middle coupler 70 and its relationship to tubular body 20 are the same as described previously in slide coupling fitting 60. Moreover, interior 86 of tubular connector 80 can have either a smooth surface, or has a threaded section 87 for threaded connection with a tubular conduit. It is noted that middle coupler 70 of slide coupling fittings 60 and 120 as described have a traditional coupling mechanism; however, middle coupler 70 can also have external threaded section 26, seal groove 30, seal member 32, and a sliding coupler 40, which operates with the same mechanism as sliding coupler 40 as described above.

It should be understood that although tubular body 20 shown in the drawings of various embodiments is straight, it can also have a curved or a bent shape, such as having a 145 degree angle between the two open ends.

Tubular body 20, tubular sliding couplers 40 and 40', middle coupler 70, and tubular coupler 110 are preferably injection molded of a plastic material, such as polyethylene, polyvinyl chloride (PVC), and polyamide.

In a further aspect, the present invention provides a method of connecting a fitting to a tubular conduit. The method includes the steps of: (1) providing a slide coupling fitting which has at least one sliding coupler 40 as described above; (2) applying an adhesive on smooth interior 44 of outer end 48 of sliding coupler 40; (3) engaging the fitting with a tubular conduit by having open end 24 toward an end of the fluid conduit, then sliding sliding coupler 40 outwardly along tubular body 20 to snuggly encase an end section of the tubular conduit; and (4) turning sliding coupler 40 around tubular body 20 to engage internal threaded section 46 with external threaded section 26, with an advancing direction toward the tubular conduit; and thereby sliding coupler 40 forms a fluid-tight connection with the tubular conduit at outer end 48 and forms a fluid-tight connection with tubular body 20 at inner end 42.

With slide coupling fittings 10 and 60, the same process can be repeated at the opposing end using sliding coupler 40' to connect a second tubular conduit.

Moreover, with slide coupling fitting 60, one can first connect middle coupler 70 to a third tubular conduit, using a traditional method either inserting an end section of the third tubular conduit into middle coupler 70 when middle coupler 70 has a smooth interior, or screw fitting 60 onto the third tubular conduit when middle coupler 70 has an internal threaded section 87. Then, the first and second tubular conduits can be jointed by slide coupling fitting 60 using sliding couplers 40 and 40' with the process described above.

With slide coupling fitting 100, one can first insert an end section of a first tubular conduit into fixed coupler 110 using traditional method with an adhesive to ensure a fluid-tight connection. Then, connect the fitting 100 to the second tubular conduit with sliding coupler 40 using the process described above.

The slide coupling fitting of the present invention has several advantages. First, the slide coupling fitting has both a threaded connection section and a sliding connection section, which effectively combines threaded connection and smooth surface adhesive connection to provide fluid-tight connection between the fitting and the conduit. However, the threaded connection is within the fitting, which does not require threading of the surface of the conduit. With an already installed conduit, threading of the conduit surface for a threading connection is often difficult or not feasible at all. Second, the slide coupling mechanism provides a convenience for jointing the fitting to a conduit, particularly for a conduit in a fixed position without mobility, such as in repairing a broken sprinkler pipe. This can be particularly true in a situation of jointing multiple conduits in relatively fixed positions. For example, with the structure of fitting 60 and the method of using sliding couplers 40 and 40' to connect two opposing conduits, one can have operation flexibilities in connecting three conduits. Third, the required turning of the sliding coupler for engaging external threaded section 26 with internal threaded section 46 assists spreading the adhesive evenly at the interface between the sliding coupler and the conduit, which provides a better sealing at the interface. Fourth, using slide coupling fitting 100, one can connect two conduits which have a relative short distance in between. Fifth, the threaded connection also provides thermal resistance to the connection interface between the conduit and the slide coupling fitting, which frequently is a challenge to the integrity of the connection under temperature sensitive environments. Other advantages of the structures and the methods of the present invention can be readily appreciated by those skilled in the art.

The invention has been described with reference to particularly preferred embodiments. It will be appreciated, however, that various changes can be made without departing from the spirit of the invention, and such changes are intended to fall within the scope of the appended claims. While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents. All patents and other publications cited herein are expressly incorporated by reference.

What is claimed is:

1. A slide coupling fitting for connecting tubular conduits, comprising:

a tubular body having a central passage defining a central axis, a first open end, an external threaded section on an exterior of said tubular body near said first open end, and an opposing second open end;

a tubular sliding coupler having an internal diameter larger than an external diameter of said tubular body, and being connected to said first open end of said tubular body; said tubular sliding coupler having an internal threaded section adjacent to an inner end which is closer to a longitudinal center of said tubular body, and a smooth interior at an opposing outer end for slidably engaging a first tubular conduit; said internal threaded section being complementary to said external threaded section of said tubular body for mutual engagement; and a seal groove extending about said central axis and a seal member which is disposed within said seal groove and extends therefrom to sealingly engage an interior periphery of said tubular sliding coupler; said seal groove being disposed between said external threaded section and said first open end, wherein said sliding coupler can be moved along said tubular body such that the entirety of said internal threaded section extends beyond said external threaded section of said tubular body in a direction toward said longitudinal center of said body.

2. The slide coupling fitting of claim 1, wherein said second end of said tubular body further comprises a tubular connector which is coaxially and fluid-tight connected to said second open end of said tubular body at one end, and with an opposing coupling end for receiving a second tubular conduit.

3. The slide coupling fitting of claim 2 further comprising:

a middle opening on said tubular body, said middle opening having a center in perpendicular to said central axis of said tubular body; and a middle coupler comprising a tubular connector extending perpendicular to said central axis of said tubular body; one end of said tubular connector being fluid-tight connected to said tubular body and an opposing open coupling end for receiving a tubular conduit; and a central axis of said tubular connector being aligned with said center of said middle opening.

4. The slide coupling fitting of claim 3, wherein said tubular body further comprises a seal groove extending about said central axis and a seal member which is disposed within said seal groove and extends therefrom to sealingly engage an interior periphery of said tubular sliding coupler; said seal groove being disposed between said external threaded section and said first open end.

5. The slide coupling fitting of claim 4, wherein said tubular body further comprises an external block section extending about said central axis on the exterior of said tubular body, and being disposed between said seal groove and external threaded section for assisting positioning of said sliding coupler along said tubular body when engaging said internal threaded section with said external threaded section.

6. The slide coupling fitting of claim 4, wherein said tubular sliding coupler further comprises an internal block section extending about a central axis of said tubular sliding coupler and disposed at said inner end and in contact with a front end of said internal threaded section for assisting positioning of said sliding coupler along said tubular body when engaging said internal threaded section with said external threaded section; and said internal block section has a diameter approximately equivalent to an outside diameter of said internal threaded section.

7. The slide coupling fitting of claim 1, wherein said tubular body further comprises an external block section extending about said central axis on the exterior of said tubular body, and being disposed between said seal groove and external threaded section for assisting positioning of said sliding coupler along said tubular body when engaging said internal threaded section with said external threaded section.

8. The slide coupling fitting of claim 1, wherein said tubular body further comprises a stopper extending about said central axis on the exterior of said tubular body disposed at approximately the longitudinal center of said tubular body.

9. The slide coupling fitting of claim 1, wherein said tubular sliding coupler further comprises an internal block section extending about a central axis of said tubular sliding coupler and disposed at said inner end and in contact with a front end of said internal threaded section for assisting positioning of said sliding coupler along said tubular body when engaging said internal threaded section with said external threaded section; and said internal block section has a diameter approximately equivalent to an outside diameter of said internal threaded section.

10. A slide coupling fitting for connecting tubular conduits, comprising:

a tubular body having a central passage defining a central axis, two opposing open ends, and an external threaded section on an exterior of said tubular body adjacent to each open end;

two tubular sliding couplers, each having an internal diameter slightly larger than an external diameter of said tubular body, and each being connected to one of said open ends of said tubular body, respectively; each said tubular sliding coupler having an internal threaded section adjacent to an inner end which is closer to a longitudinal center of said tubular body, and a smooth interior at an opposing outer end for slidably engaging a tubular conduit; said internal threaded section being complementary to said external threaded section of said tubular body for mutual engagement; and at said each open end a seal groove extending about said central axis and a seal member which is disposed within said seal groove and extends therefrom to sealingly engage an interior periphery of said tubular sliding coupler; each said seal groove being disposed between said external threaded section and said open end on one corresponding side of said tubular body, respectively.

11. The slide coupling fitting of claim 10, wherein said tubular body further comprises at said each open end an external block section extending about said central axis on the exterior of said tubular body; and each said external block section being disposed between said seal groove and said external threaded section on one corresponding side of said tubular body, respectively, for assisting positioning of said sliding coupler along said tubular body when engaging said internal threaded section with said external threaded section.

12. The slide coupling fitting of claim 10, wherein said tubular body further comprises a stopper extending about said central axis on the exterior of said tubular body disposed at approximately the longitudinal center of said tubular body.

13. The slide coupling fitting of 10, wherein each of said tubular sliding couplers further comprises an internal block section extending about a central axis of said tubular sliding coupler and disposed at said inner end and in contact with a front end of said internal threaded section for assisting positioning of said sliding coupler along said tubular body when engaging said internal threaded section with said external threaded section; and said internal block section has a diameter approximately equivalent to an outside diameter of said internal threaded section.

14. The slide coupling fitting of claim 10 further comprising:

a middle opening on said tubular body and a middle coupler comprising a tubular connector extending from said middle opening in perpendicular to said central axis of said tubular body; one end of said tubular connector being fluid-tight connected to said tubular body and an opposing open coupling end for receiving another tubular conduit.

* * * * *